United States Patent

[11] 3,577,005

[72] Inventor Alton O. Christensen
Houston, Tex.
[21] Appl. No. 879,221
[22] Filed Nov. 24, 1969
[45] Patented May 4, 1971
[73] Assignee Shell Oil Company
New York, N.Y.
Continuation-in-part of application Ser. No. 787,067, Dec. 26, 1968, now Patent No. 3,502,908, which is a continuation-in-part of application Ser. No. 761,450, Sept. 23, 1968.

[54] TRANSISTOR INVERTER CIRCUIT
3 Claims, 8 Drawing Figs.

[52] U.S. Cl. .......... 307/205, 307/214, 307/251, 307/317
[51] Int. Cl. .......... H03k 19/08
[50] Field of Search .......... 317/235 (UX), 22.2, 31; 307/205, 215, 251, 279, 304, 214, 256, 317

[56] References Cited

UNITED STATES PATENTS

| | | | |
|---|---|---|---|
| 3,252,009 | 5/1966 | Weimer | 307/251X |
| 3,393,325 | 7/1968 | Borror et al. | 307/205 |
| 3,440,444 | 4/1969 | Rapp | 307/205X |
| 3,502,908 | 3/1970 | Christensen | 307/205X |

OTHER REFERENCES

ELECTRONICS DESIGN NEWS June 10, 1968 " Multiphase clocking etc." Boysel et al. pp. 50, 51 (copy in Scientific Library and Art Unit 254)

IBM TECHNICAL DISCLOSURE BULLETIN vol. 10 no. 12, May, 1968 " FET INVERTER" by Pomeranz et al. (copy in Art Unit 254)

*Primary Examiner*—John S. Heyman
*Attorneys*—J. H. McCarthy, Theodore E. Bieber and Harold L. Denkler

ABSTRACT: A ratioless MOSFET inverter for capacitive outputs consists basically of a pair of MOSFET's with their sources and drains tied together. The clock input is applied to the common drain connection and to the gate of one of the MOSFET's and the output is connected to the common source connection. In an alternative construction, the MOSFET whose gate is connected to the clock is replaced by a Schottky diode connected between the source and drain terminals of the data input MOSFET. The clock is connected to the drain terminal of the data input MOSFET, and the output is connected to the source of the data input MOSFET.

INVENTOR.
ALTON O. CHRISTENSEN
BY
Mellin, Moore & Weissenberger
ATTORNEYS

TRANSISTOR INVERTER CIRCUIT

CROSS-REFERENCE TO RELATED APPLICATIONS

This application is a continuation-in-part of copending application Ser. No. 787,067 now U.S. Pat. No. 3,502,908, which in turn is a continuation-in-part of application Ser. No. 761,450 filed Sept. 23, 1968, both entitled "Transistor Inverter Circuit."

BACKGROUND OF THE INVENTION

The aforementioned related applications disclose a ratioless IGFET (insulated gate field effect transistor) inverter, particularly the type in which a pair of MOSFET's (metal oxide silicon field effect transistors) are connected back to back, i.e. their drains are connected together and their sources are connected together. A clock or precharge input is applied to the common drain connection, and the output is taken at the common source connection. The clock input is also applied to the gate of one of the MOSFET's (the precharge gate), and the input is applied to the gate of the other MOSFET (the data gate). The operation of the circuit, essentially, involves the principle that when the clock goes negative (assuming the MOSFET's are of the N-type), the precharge gate is enabled and the output goes to logic 1. The inherent capacity of the output stores the logic 1 state after the clock returns to ground. If the data input to the data gate is negative following cessation of the clock, the output capacitance discharge to ground through the data gate, and a logic 0 state is established in the output. On the other hand, if the data input to the data gate is at ground following the cessation of the clock pulse, the output capacitance cannot discharge, and the output remains at logic 1.

It will be noted that the construction just described requires two MOSFET's with separate gates. Inasmuch s the miniaturization of computing circuits is a primary object of the MOSFET technology, it would be highly desirable to accomplish the same result with a single MOSFET so as to reduce the chip are required by any given inverter. In addition, it is desirable to increase the switching speed of the inverter circuit to the greatest extent possible.

SUMMARY OF THE INVENTION

In accordance with the aspect of the invention which the present continuation-in-part adds to the teaching of its parent applications, the barrier diode effect occurring between certain metal overlays and the P-diffusion at a P-region contact point is utilized to eliminate the necessity for the precharge gate MOSFET without requiring the additional diffusion associated with a junction diode.

In accordance with the invention, an overlay of a metal matched to the doping material of the underlying P-diffusion is deposited onto the P-region constituting the drain electrode of the data gate MOSFET. Whereas overlays of mismatched metals act essentially as contact points, overlays of metal matched to the P-diffusion in accordance with known semiconductor metallurgy techniques cooperate with the P-diffusion to act essentially as a barrier diode in which the P-diffusion is the cathode and the metal overlay is the anode. This type of diode is known as a Schottky diode.

In operation, the precharging of the output capacitance takes place simply by applying a negative clock pulse to the output in the conducting direction of the diode. After the cessation of the clock pulse and the precharge of the output capacitance, the diode connection is reverse-biased and the logic state of the output is then controlled, as in the circuit of the parent applications, by the conductivity of the data gate.

It is therefore the object of the invention to provide a ratioless inverter circuit.

It is a further object of the invention to provide a ratioless inverter circuit.

It is a further object of the invention to provide a ratioless MOSFET inverter circuit.

It is another object of the invention to provide a fast-acting ratioless MOSFET inverter circuit requiring only a single MOSFET.

It is a further object of the invention to use the Schottky diode effect of a P-diffusion-to-matched-metal junction of a MOSFET circuit to precharge the inherent capacitance of the inverter output without the use of a MOSFET precharge gate.

It is a still further object of the invention to provide a MOSFET inverter circuit in which the switching speed is increased due to the reduction of intracircuit parasitic capacitance.

DESCRIPTION OF THE PREFERRED EMBODIMENT

Figure 1:
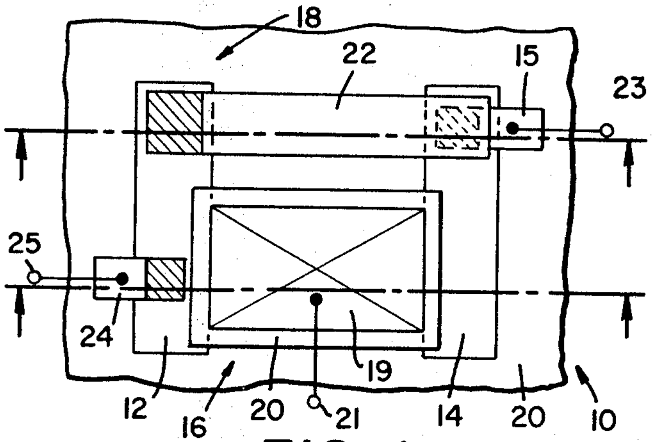
FIG. 1 is a plan view of an inverter circuit in accordance with this invention.
Figure 2:
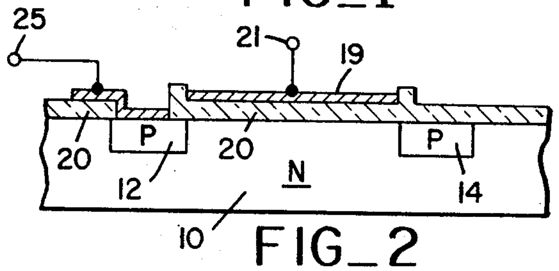
FIG. 2 is a vertical section along the line 2–2 of FIG. 1.
Figure 3:
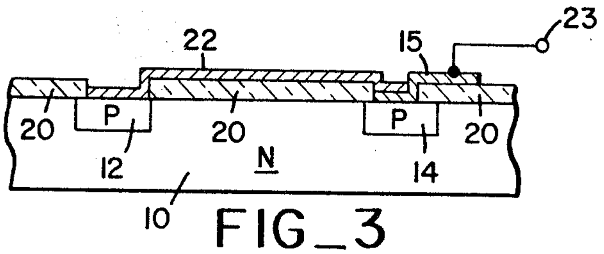
FIG. 3 is a vertical section 3–3 of FIG. 1.

FIGS. 1—3 show a typical physical embodiment of an inverter according to the present invention. A silicon substrate 10 of N-material contains P-diffusions 12, 14. The P-diffusion 12 forms the drain electrode of MOSFET 16 and the cathode of Schottky diode 18. The P-diffusion 14 is provided with a contact strip 15 of unmatched metal and forms the source electrode of the MOSFET 16, whose metallic gate electrode 19 is separated from the substrate 10 by a dielectric layer 20 of silicon oxide to constitute the data input terminal 21 of the inverter.

An overlay 22 of metal matched to the doping material of the P-diffusion 12 is plated thereon to form the anode of Schottky diode 18. The metal overlay 22 is also connected to the contact strip 15 of unmatched metal plated onto the P-diffusion 14. The contact strip 15 constitutes the clock terminal 23 of the inverter. A metallic contact strip 24 is applied to the P-diffusion 12 to form the output terminal 25 of the inverter.

It will be noted that the metal overlay 22 is separate and distinct from, although in electrical contact with, the metallic contact strip 15. In order to secure a diode effect between the metal overlay 22 and the P-diffusion 12, it is necessary that the metal of the metal overlay 22 be a metal matched to the P-diffusion 12, i.e. having approximately the same barrier voltage as the doping material used in creating the P-diffusion 12. An appropriate metal for this purpose may be selected in accordance with conventional metallurgical techniques well known in the semiconductor art.

On the other hand, the contact strip 15, as well as the contact strip 24, is preferably formed of an unmatched metal, commonly aluminum, which as little or no bipolar characteristics with respect to the P-diffusion to which it is applied.

The threshold or barrier voltage of the Schottky diode 18 is on the order of 0.25 v. It will be noted that this compares favorably with the 3—4-volt threshold of a MOSFET. As a result, the Schottky diode 18 is capable of beginning the charging process of the output capacitance 28 at a somewhat earlier moment in the rise time of the clock pulse.

Figure 4:
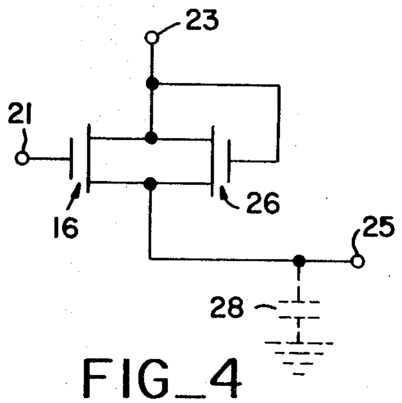
FIG. 4 is a circuit diagram illustrating the basic inverter circuit of the parent applications.
Figure 5:
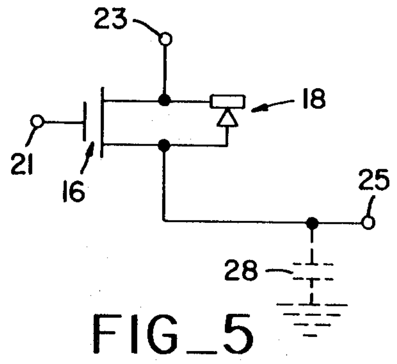
FIG. 5 is a circuit diagram of the inverter circuit according to the present invention.

Referring now to FIGS. 4 and 5, the description of the operation and physical structure of the circuit of FIG. 4 is incorporated herein by reference from the parent applications identified hereinabove. Basically, a negative clock pulse applied to clock terminal 23 in FIG. 4 enables precharge MOSFET 26 and imparts a negative charge to the inherent capacitance 28 of the output 25 (the inverter of this invention is designed to feed into a purely capacitive output circuit).

After the cessation of the clock pulse and the return of the clock to ground, the logic state of the output 25 is determined by the data input 21 to the gate electrode 19 of the data gate MOSFET 16. If the data input 21 is negative, data gate 16 is enabled, and the output capacitance 28 discharges through data gate 16 to clock ground. If, on the other hand, data input 21 is at ground, data gate 16 is blocked and the output capacitance 28 cannot discharge.

Figure 6:
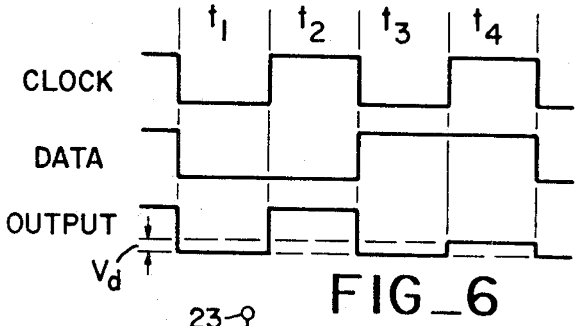
FIG. 6 is a time-amplitude diagram illustrating the time relation of the clock, data, and output pulses in the circuits of FIGS. 4 and 5.

As a practical matter, the output capacitance in the circuit of FIG. 4 does discharge to some degree even when the data input 21 is at ground because a limited discharge path is available through the interelectrode capacitances of the precharge gate 26. This discharge, shown as $V_d$ in FIG. 6, requires the clock potential to be substantially higher than the desired logic 1 potential on the output capacitance 28. For example, a 9-volt logic 1 output level typically requires a clock potential of about 14 volts.

An examination of FIG. 5 reveals that the circuit of FIGS. 1—3 and 5 operates electrically in the same manner as the circuit of FIG. 4. During the clock pulse, the diode 18 is forward-biased, and the clock pulse is transmitted to the output capacitance 28. Upon the return of the clock potential to ground, the diode 18 becomes reverse-biased, and output capacitance 28 can only discharge if data gate 16 is enabled.

Because of the extremely low internal capacitance of the diode 18, however, the parasitic discharge $V_d$ (FIG. 6) is substantially eliminated. In addition, the diodes lack of substantial internal capacitance avoids the voltage divider action normally occurring between the internal capacitance of precharge gate 26 and the output capacitance 28. Typically, a 9-volt logic 1 output level in the inverter of this invention requires only a 9¼-volt clock.

Inasmuch as the charging power for capacitance 28 is $P=CE^2$, where $C$ is the total capacitance seen by the clock and $E$ is the clock potential, it will be readily understood that this results in a very substantial (about 65 percent) saving of clock power, which allows the use of much smaller clock drivers. At the same time, the inverter of this invention occupies less area on the chip than the inverter of FIG. 4; yet the charging speed of the output capacitance 28 is substantially increased because the current-carrying capacity of the diode 18 per unit area is considerably greater than that of MOSFET 16.

The fabrication of the device of this invention is not substantially more complex than that of the inverter of the parent applications. Like the latter, the inverter of this invention requires only a single diffusion, and its only additional requirement is that of an additional mask for the deposition of the metal overlay 22 separately from the deposition of the contact strips and gate electrode 15, 19 and 24.

Figure 7:
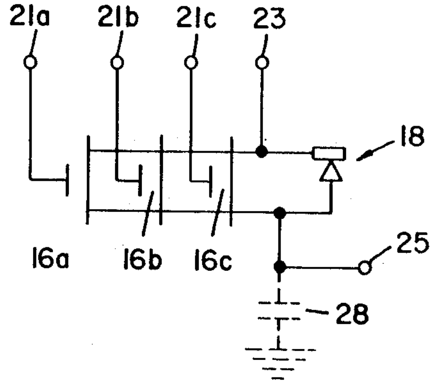
FIG. 7 is a circuit diagram of a NAND gate using the teaching of this invention.
Figure 8:
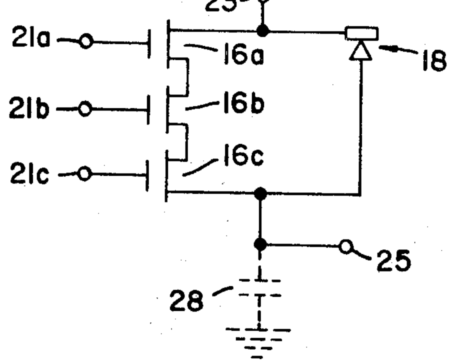
FIG. 8 is a circuit diagram of a NOR gate using the teaching of this invention.

FIGS. 7 and 8 illustrate the application of the inventive concept to NOR and NAND gates, respectively. It will be obvious that in the circuit of FIG. 7, the output capacitance 28 will discharge whenever any one or more of data gates 16*a*, 16*b*, 16*c* are enabled, whereas in the circuit of FIG. 8, the output capacitance 28 will discharge only when all the data gates 16*a*, 16*b*, 16*c* are enabled.

I claim:

1. A ratioless inverter circuit for capacitive output loads comprising:
   a. semiconductor means having current-inlet and current-outlet electrodes and a control electrode for controlling the flow of current between said current-inlet and current-outlet electrodes;
   b. a two-electrode barrier diode connected directly and exclusively across said current-inlet and current-outlet electrodes;
   c. a source of data pulses connected to said control electrode;
   d. a source of clock pulses connected to one end of said diode; and
   e. output means connected between the other end of said didoe and a point of reference potential.

2. The circuit of claim 1, in which said semiconductor means is a field effect transistor, said current-inlet and current-outlet electrodes are its source and drain electrodes, and said control electrode is its gate electrode.

3. The circuit of claim 2, in which said field effect transistor is a MOSFET, and said diode is a Schottky diode.